United States Patent [19]

Dykstra et al.

[11] 4,014,709

[45] Mar. 29, 1977

[54] OPACIFYING PIGMENTS AND METHODS FOR MAKING SAME

[75] Inventors: Franz R. Dykstra, Haverford, Pa.; Aldo P. Allegrini, Westfield, N.J.; Miller B. Mallary, Macon, Ga.; Tom A. Cecil, Highland Park, N.J.

[73] Assignee: Engelhard Minerals & Chemicals Corporation, Menlo Park, Edison, N.J.

[22] Filed: June 8, 1976

[21] Appl. No.: 693,751

[52] U.S. Cl. .............................. 106/300; 106/72; 209/5

[51] Int. Cl.² ...................... C09C 1/36; C09C 1/28

[58] Field of Search .................. 106/300, 72; 209/5

[56] References Cited

UNITED STATES PATENTS

| | | | |
|---|---|---|---|
| 3,301,695 | 1/1967 | Mercade | 106/72 |
| 3,337,048 | 8/1967 | Mercade | 106/72 |
| 3,353,668 | 11/1967 | Duke | 106/72 |
| 3,450,257 | 6/1969 | Cundy | 209/5 |

*Primary Examiner*—Winston A. Douglas
*Assistant Examiner*—J. V. Howard
*Attorney, Agent, or Firm*—Inez L. Moselle

[57] ABSTRACT

Described are novel inexpensive opacifying pigments having a color ranging from tan to light dun and useful, for example, in the manufacture of paints and plastics. The pigments are composed of a mixture of a major weight proportion of particles of iron-bearing titania concentrated from a sedimentary kaolin clay ore and a minor proportion of particles of thermally dehydrated kaolin clay. Also described are methods for manufacturing such pigments from the waste product of clay beneficiation, preferably "Ultraflotation" beneficiation.

8 Claims, No Drawings

OPACIFYING PIGMENTS AND METHODS FOR MAKING SAME

BACKGROUND OF THE INVENTION

1. Field of the Invention

This invention relates to novel composite titania pigments and their manufacture. In particular, the invention relates to novel off-white pigment compositions obtained from by-products (heretofore considered to be wastes) of the beneficiation of sedimentary kaolin clay to remove colored iron-bearing titaniferous impurities normally associated with the clay.

2. Prior Art

The usual pigmentary grades of titanium dioxide are relatively expensive pigments which are widely used to opacify a variety of systems such as plastics and paints. Conventional pigment grades of titanium dioxide contain over 88 percent $TiO_2$, in some cases over 98 percent $TiO_2$, and have a bright white color. These pigments may be obtained from ilmenite by the so-called "sulfate" process or, more recently, from rutile by the so-called "chloride" process. Typically pigmentary grades of titania have a brightness of 95 percent or above and have low abrasiveness, for example less than 50 mg. as measured by the well-known Valley Abrasion method. Average particle size is usually in the range of 0.2 to 0.4 micron. The high brightness, fine particle size and low abrasiveness of pigmentary titania is essential in many of the important commercial uses. A relatively inexpensive commercial titania product is obtained by extracting iron from ilmenite ores. Reprsentative products of this type, referred to as "upgraded ilmenites," analyze about 94 percent $TiO_2$ and have a brightness of about 38 to 40 percent. The upgraded ilmenite has a buff color and is useful as an opacifier in certain systems in which the whiteness of conventional pigmentary titanium dioxide is not necessary. However, the product is a relatively coarse material that is difficult to grind. Even when fluid energy equipment is used, the average particle size exceeds 2 microns and the abrasion index is above 500 mg. This precludes use of upgraded ilmenite as an opacifier in many paint and plastic systems in which the white color of conventional titanium dioxide minerals is not essential.

Naturally-occurring kaolin clay crudes, such as those present in deposits in Georgia, contain discrete iron-bearing titania impurities which detract from the value of the clay as paper coating pigments. These impurities impart an undesirable yellow or orange tinge to the clay even when present at low concentrations, typically 1 percent to 2 percent of the dry clay weight. Froth flotation with anionic (fatty acid) collectors, selective flocculation by organic polymers and the controlled use of inorganic dispersants are among the wet-processing methods suggested for removing the colored impurities from kaolin clay. "Ultraflotation" (described in U.S. Pat. No. 2,990,958 to E. W. Greene et al) is used on a largescale commercial basis for such purpose. In practicing "Ultraflotation" the colored titaniferous impurities report in a froth along with other metallic impurities and flotation oils. Particulate calcite (added to the flotation feed to aid in flotation of the impurities) is also present in the froth concentrate which has a mustard-like color and an oily plastic consistency. Considering the chemical composition and physical condition of the by-product froth, it is not unexpected that this material has been considered to be a waste effluent, unsuitable without costly preliminary processing as a feed for the production of titania pigments by chlorination or sulfation.

U.S. Pat. No. 3,536,264 to Helton, Jr. et al describes a method for removing titanium mineral impurities from kaolin clays by a modified sedimentation process. The patent suggests that the sediment may be "a valuable source of titanium minerals" but no means for implementing such suggestion are provided. To the best of our knowledge, colored impurities removed by all known kaolin beneficiation techniques are not and have never been upgraded to produce useful articles of commerce.

THE INVENTION

We have discovered that waste by-products of kaolin clay beneficiation plants are useful, after relatively simple processing, for a variety of industrial applications since the resulting products are pigments possessing outstanding hiding power and low abrasiveness.

Stated briefly, one aspect of the invention relates to novel opacifying pigments which are mixture composed predominantly of a major weight proportion of particles of iron-bearing titania orginally present as an impurity in kaolin clay and a minor weight proportion of particles of thermally dehydrated (anhydrous or substantially anhydrous) kaolin clay, preferably in relative proportions such that the pigments analyze (dry weight basis) from 60 percent to 85 percent $TiO_2$, from 10 to 30 percent aluminum silicate, from ¼ to 8 percent oxide(s) of iron, usually 2 to 5 percent, and from 0 to 2 percent water. The pigments have a color ranging from tan to light dun, an average particle size (as determined by a TAPPI sedimentation procedure T-649-sm-54) in the range of 0.3 to 1 microns, usually about 0.3 to 0.5 micron, a Valley Abrasion index below 100 mg., usually below 50 mg., and a specific gravity in the range of 3.0 to 4.0. Optionally the pigments contain up to 5 percent inerts which may be one or more oxides or silicates of metals such as zirconium and/or rare earths. Pigment brightness (as measured by the TAPPI tentative standard method T646 M-54 using an Elrepho brightness meter) is typically in the range of 40 to 65 percent, most usually about 50 to 60 percent.

The pigments of the invention possess outstanding opacifying properties and are useful inter alia as fillers for off-white paints or primers, as wood fillers, ceramic opacifiers or as an ultraviolet screen for PVC compounds such as pipe.

The other aspect of the invention relates to methods for producing off-white opacifying pigments from aqueous waste concentrates obtained as by-products when naturally-occurring sedimentary kaolin clays are beneficiated by wet separation means, preferably "Ultraflotation," to improve color by removing discoloring impurities. These concentrates comprise a concentrate of particles of discoloring iron-bearing titanium minerals frequently mixed with one or more iron minerals and associated with particles of kaolin clay, the later usually being the predominating solid ore constituent. Generally clay dispersants, normally alkali metal salts of polyanionic acids such as sodium silicate or sodium phosphates, are used in clay beneficiation and are present in the titania concentrates. Processing in accordance with this invention comprises removing sufficient clay to produce pigments containing 60 to 85 percent titania as well as removing any alkali and alkaline earch compounds (such as the calcite carrier employed in Ultraflotation beneficiation of clay), dewatering, thermal treatment to dehydrate the residual clay and to burn off any organics (present when "Ultraflotation" is employed), and then pulverization.

DETAILED DESCRIPTION

Feed materials employed in the production of pigments of the invention are concentrates of colored discrete iron-bearing titania minerals obtained as by-products when sedimentary kaolin clay crudes are beneficiated to improve the brightness of the clays by wet separation methods. Exemplary of such benefication methods known in the art are flotation and selective flocculation of colored impurities and techniques in which colored impurities are sedimented by controlled addition of inorganic clay dispersants. Invariably appreciable quantities of clay particles are entrained with the colored titaniferous impurities when practicing known beneficiation techniques. The crude clays normally contain less than 2 percent titanium dioxide and known wet processing methods do not permit removal of such a minor constituent without entrapping a significant amount of clay particles, especially so in the case of clay particles of very fine particle size. The by-product titania concentrates of some beneficiation techniques also contain organic reagents, namely fatty acids and oils in the case of flotation beneficiation and organic polymers when selective flocculation is employed. Sodium silicate, alkali such as sodium hydroxide, soda ash and/or sodium phosphates are also usually contained in the conentrates since beneficiation of clay is usually carried out using dispersed alkaline pulps or suspensions of impure feed clay.

In most instances the clay content of the concentrates of clay beneficiation will exceed substantially that of the colored titania impurities. For example, a representative concentrate obtained by "Ultraflotation" may contain 700 pounds of clay per 100 pounds of titania. It is essential to reduce the amount of clay to a level such that the final pigment contains the desired proportions of titanium dioxide and aluminum silicate, which typically is approximately 1.5/1 to 4/1 on a dry weight basis. In the case of the flotation concentrate of the composition above described, this will necessitate removal of about 90 percent of the clay from the froth obtained by flotation. Flotation oils and other organics must also be eliminated from the solids in the froth. This may be accomplished, by way of example, by solvent extraction and heat treatment (or by heat treatment alone). Heat treatment is carried out at a time and temperature sufficient to burn the organics substantially completely. Simultaneously the clay remaining after controlled removal of the clay from the titania concentrate is dehydrated. Thus, the heat treatment may serve the dual function of eliminating organics (employed in the clay beneficiation) which would be undesirable in the pigment product and dehydrating the clay, as required to provide a pigment composite having the desired spectrum of pigmenting properties. The heat treatment must be carried out at a temperature below that at which abrasive particles are formed and must be conducted after substantially all alkali and alkaline earth metal compounds are removed. Temperatures in the range of about 800° F. to 1800° F. for times in the range of 5 minutes to 24 hours are recommended.

Preferably the feed material used to produce the pigment is a froth product obtained by "Ultraflotation" using a fatty acid collector and calcite as a carrier in an alkaline dispersed pulp such as described in U.S. Pat. No. 2,990,958. The froth product will be a mixture of colored clay impurities, calcite, flotation oils, entrained clay and will contain dissolved alkali metal salts. The presence of calcite in the froth concentrate facilitates removel of clay by simple washing and thus it is desirable to "declay" the feed before attempting to remove the calcite carrier particles. After removing a preselected amount of clay from the froth product of "Ultraflotation" beneficiation, all (or substantially all) of the calcite must be removed. Flotation procedures for removing calcite from the froth concentrate of "Ultraflotation" beneficiation of kaolin clay are described in U.S. Pat. No. 3,107,214 to James B. Duke, U.S. Pat. No. 3,331,505 to Venancio Mercade and U.S. Pat. No. 3,635,337 to Venancio Mercade et al. Using these techniques, appreciable oil is eliminated with the floated calcite particles. Calcite and alkali metals should be removed before residual flotation oils are eliminated by combustion in order to avoid fluxing.

Alkali metal compounds are conveniently removed after flotation of calcite by any one of such procedures. This is readily accomplished by acidifying the suspension of clay and colored impurities after removal of calcite by flotation to cause flocculation of the solids in the suspension and dewatering the flocculated suspension by known means such as filtration or centrifugation. When the suspensions are highly diluted it will not be necessary to rinse the dewatered solids since substantially all alkali metal cations will report with the pulp water.

After heat treatment in which the clay component is dehydrated, the mixture must be milled to distintegrate agglomerates. Conventional pulverizing equipment such as a hammer mill will suffice. Normally the milling is carried out in a manner such as to eliminate coarse residue (e.g., particles larger than 325 mesh, Tyler). High energy grinding equipment such as fluid energy mills are not needed to produce the desired micron-size particles.

The shade, hue and intensity of the color of pigments within the scope of the invention are determined lagely by the nature of the colored impurities in the by-product of kaolin manufacture that is used as a starting material. For example, the presence of an appreciable quantity of discrete particles of oxides or silicates of iron along with iron-contaminated titania will tend to impart a more intensive color to the pigment product. Hue will depend inter alia on the oxidation state of the iron. Also, the color of iron-contaminated titania varies somewhat with crude clay of different origin, ranging from a yellow color to those which are brown or mustard-like. Pigments of the invention may be blended with white or various colored pigments such as iron oxide pigments to produce desired shades and color intensities.

The following example is given to illustrate a preferred method for producing a pigment of the invention and to demonstrate some of the uses of the product. In this example, all weights are reported on the basis of 1000 tons of feed material, dry weight basis, unless otherwise indicated.

The feed material used to produce the pigment of the invention was a sample of waste froth from a commercial plant using "Ultraflotation" to produce a white coating clay fraction from a sedimentary kaolin clay crude from central Georgia. The waste froth contained about 10 percent solids. Each 1000 pounds of solids contained about 750 pounds clay, 106 pounds of a mixture composed largely of discolored iron-bearing titania and contained minor amounts of other metal oxides, 1168 pounds calcite and 38 pounds flotation oil (mixture of fatty acids and hydrocarbon oils).

To remove clay, the froth was diluted with water to about 1 percent solids and the minerals were dispersed by adding "O" sodium silicate solution in amount of about 0.075 percent based on the weight of the solids in the froth. The suspension was allowed to settle, whereby three layes formed. The middle layer containing the bulk of the clay was separated from the upper and lower layers, which were combined. The clay suspension that was removed was discarded.

The combined upper and lower layers containing most of the titania impurities, calcite, flotation oils and a portion of the clay was at 10 percent solids. This material was processed to remove the calcite. To accomplish this the suspension was filtered under vacuum, producing a filter cake at 75 percent solids. The filter cake contained about 21 pounds clay, 558 pounds calcite, 48 pounds $TiO_2$ (associated with minor amounts of other metal oxides and/or silicates) and 38 pounds organics. To desorb flotation oils from the clay and titania in the cake in order to permit selective flotation of calcite, "O" sodium silicate solution (1.25 percent based on the dried weight of the cake) and soda ash (0.75 percent based on dried weight of the cake) were added and the mixture was thoroughly mixed in a vertical blunger and allowed to age for 48 hours at room temperature. The treated filter cake was diluted with water to 25 percent solids to produce a flotation pulp. The pulp was then aerated in a flotation cell. Essentially all of the calcite in the filter cake (558 pounds) floated along with about 28 pounds of the flotation oils and minor amounts of titania and clay. The flotation tailings were recovered at about 1 percent solids.

To remove water from the tailings it was necessary to flocculate the system. To accomplish this, dry adum was added in amount of 0.9 percent, based on the weight of the solids in the tailings and then concentrated sulfuric acid was added to reduce pH to about 3. The flocculated tailings were filtered, producing a cake (61 percent solids) containing 37 pounds $TiO_2$, 14 pounds clay, 10 pounds organics and 3 pounds inerts.

The filter cake was calcined in a furnace at 1300° F. under oxidizing conditions for about 12 hours, cooled and pulverized in a Mikropulverizer through a 0.03 inch screen.

The resultant pigment had the following chemical composition:

|  | Wt. % |
|---|---|
| $TiO_2$ | 68.3 |
| $Fe_2O_3$ | 4.2 |
| $SiO_2$ | 12.4 |
| $Al_2O_3$ | 12.3 |
| $H_2O$ | 1.0 |
| Inerts | 1.8 |
|  | 100.0 |

Brightness was 43 percent. Valley Abrasion was 70 mg. Oil absorption (ASTM D-281-31) was 17.5. Specific gravity was 3.2. The product was 90 percent finer than 2 microns and 75 percent finer than 1 micron as determined by the TAPPI procedure. Average particle size (50 percent by weight finer than) was 0.5 micron. Color was a deep buff.

For purposes of comparison, properties of a commercial buff-colored upgraded ilmenite pigment having a similar brightness (40 percent) were evaluated. This material analyzed 94 percent $TiO_2$, 2 percent $Fe_2O_3$, 1.5 percent $SiO_2$ and 1.0 percent $Al_2O_3$. The average particle size was found to be 2.4 microns, appreciably coarser than pigments of the invention, and the Valley Abrasion was about 670, almost ten times the abrasiveness of the pigment of the invention.

A sample of the pigment of the invention was evaluated as an opacifier in a soya alkyd resin and the results compared with those obtained using a 60/40 mixture of commercial pigmentary $TiO_2$ and Mapico Tan No. 10 iron oxide to obtain a product of similar color and opacity.

Formulas and processing are summarized below.

| Material | Parts By Wt. | Parts By Wt. |
|---|---|---|
| Syntex 62 (soya alkyd) | 75.0 | 75.0 |
| $TiO_2$, CR 800 | — | 120.0 |
| Mapico Tan No. 10 | — | 80.0 |
| Pigment of Invention | 100.0 | — |

One pass over three roll mill at 325 pressure setting.

| | | |
|---|---|---|
| Syntex 62 | 125.0 | 125.0 |
| 24% Pb Naphthenate | 0.8 | 0.8 |
| 6% Co Naphthenate | 0.7 | 0.7 |
| | 301.5 | 401.5 |

The properties of the filled plastics are as follows:

| Kubelka-Munk Hiding Power | Pigment of Invention | 60/40 $TiO_2$, Iron Oxide Mixture |
|---|---|---|
| ft.$^2$/gal. at 0.98 C.R. | 976 | 1159 |
| RW (Roo) | 33.4 | 33.3 |

The results of the evaluations reported above indicate that 100 parts by weight of the pigment of the invention exhibited almost as much hiding power as 200 parts by weight of the mixture of commercial titania and iron oxide.

Another sample of the pigment of the invention was used successfully at a 1 percent of addition to opacify extruded PVC piping. The pigment was readily dispersed in the formulation and produced a uniform opaque tan extrudate.

Thus, a useful buff opacifying pigment was produced from a waste product of commercial manufacture.

Those skilled in the flotation art will recognize that the by-product calcite removed from the other constituents along with flotation oils may be recycled to the "Ultraflotation" plant for reuse as a carrier as suggested in references cited above. Further it will be appreciated that by converting the waste product into a pigment by the process illustrated above and by recycling the recovered calcite, a substantial reduction in the volume of waste solids could be realized. For example, in the process described, about 60 percent of the solids in the "Ultraflotation" froth were converted into useful products, thereby reducing significantly the capacity of impoundment sites required to accommodate waste products.

We claim:

1. A pigment having a color ranging from tan to light dun and useful in the manufacture of paints and plastics as an opacifier, said pigment comprising a mixture composed predominantly of a major weight proportion of particles of iron-bearing titania impurity originally contained in sedimentary clay and a minor weight proportion of particles of thermally dehydrated kaolin clay.

2. A pigment having a color ranging from tan to light dun and useful in the manufacture of paints and plastics comprising a mixture of particles of iron-bearing titania impurity originally contained in sedimentary kaolin clay and particles of thermally dehydrated kaolin clay, said pigment containing, on a weight basis, from about 60 percent to 85 percent titania, 10 percent to 30 percent aluminum silicate, ¼ percent to 8 percent iron oxide and from 0 percent to 2 percent water, said pigment having an average particle size in the range of 0.3 to 1 microns, a Valley Abrasion index below 100 mg. and a specific gravity in the range of 3.0 to 4.0.

3. The pigment of claim 2 which has a G.E. brightness in the range of 40 percent to 60 percent.

4. The pigment of claim 3 which has a particle size distribution such that essentially all of the particles are finer than 10 microns, and at least 90 percent by weight are finer than 2 microns.

5. Pigment of claim 1 containing about 68 percent titania and 2 to 5 percent oxides of iron.

6. A method for producing the pigment of claim 1 which comprises concentrating particles of a colored iron-bearing titania impurity from kaolin clay with which said titania is associated in nature, said particles of titania being concentrated along with adherent fine particles of clay, removing a portion of the clay particles from the iron-bearing titania, eliminating any alkali and alkaline earth materials that may be present, heating the remaining solids at a temperature and time sufficient to burn off any organic material and to dehydrate the clay, cooling and pulverizing the resulting material.

7. The method of claim 6 wherein said particles of colored iron-bearing titania impurity with adherent clay are concentrated from an aqueous slip of kaolin clay by froth flotation.

8. The method of claim 7 wherein Ultraflotation is employed to concentrate said impurities, calcite being used to aid in the flotation, said calcite being removed by flotation from said concentrate after removing a portion of said clay therefrom.

* * * * *